Sept. 18, 1956 W. SIX ET AL 2,763,722
BUSY TONE CIRCUIT FOR AUTOMATIC TELEPHONE SYSTEMS
Filed April 30, 1953
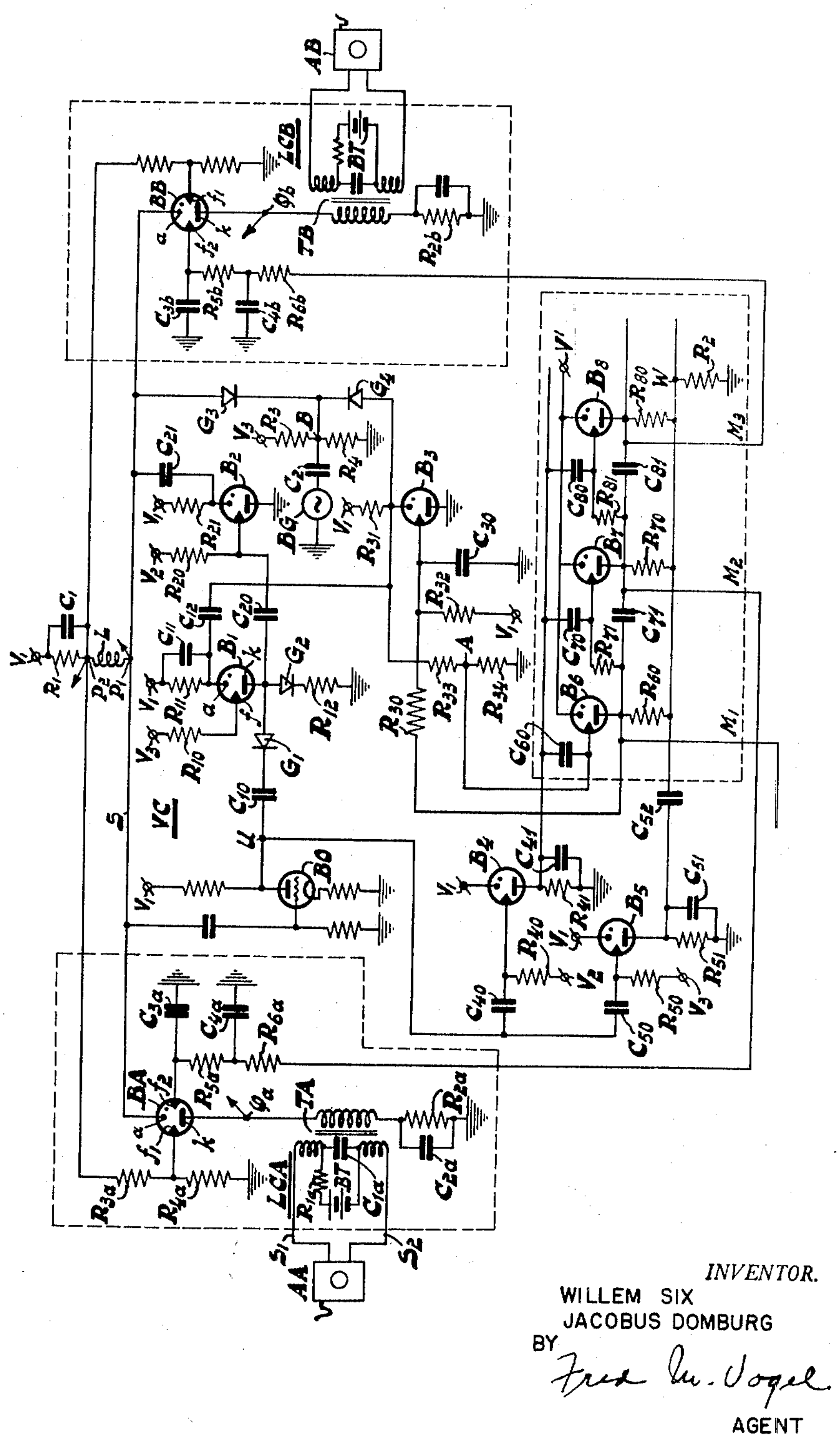
INVENTOR.
WILLEM SIX
JACOBUS DOMBURG
BY Fred M. Vogel
AGENT 2,763,722

BUSY TONE CIRCUIT FOR AUTOMATIC TELEPHONE SYSTEMS

Willem Six and Jacobus Domburg, Eindhoven, Netherlands, assignors to Hartford National Bank and Trust Company, Hartford, Conn., as trustee Application April 30, 1953, Serial No. 352,092

Claims priority, application Netherlands May 5, 1952

4 Claims. (Cl. 179—18)

This invention relates to a circuit arrangement of an automatic telephone system for giving busy tone.

It has been suggested to use a circuit-arrangement of an electronic telephone system in which contacts of a member for numerical completion of a connection between an incoming line and one of several outgoing lines, for example a selector, are constituted by gas discharge systems in which a first electrode is connected with the incoming line, this line being coupled via an input resistor to a first terminal of a supply source, whereas a second electrode of the gas discharge systems is coupled via a resistor to a second terminal of the supply source and is coupled in addition to one of the numerical outgoing lines. In addition, provision is made for an electronic marking circuit for receiving dialling pulses. Several output marking points of the marking circuit are coupled to a trigger electrode of the numerically corresponding gas discharge system. On reception of a given dialling signal the gas discharge system which couples the line loop of the selector to the numerically wanted outgoing line is struck under the control of the marking circuit, if the line concerned is free. However, if the line is engaged the output resistor concerned passes current and the voltage drop across this resistor is effective at one or more electrodes of the associated gas discharge system so as to prevent the tube from being struck. In this case, the desired call cannot be established and this must be indicated to the calling subscriber by the supply of busy tone.

Also if one of the subscribers breaks the connection the other subscriber should receive busy tone.

In the circuit-arrangement according to the invention the incoming line is coupled to a busy tone generator via circuit elements which are controlled by the voltage of the incoming line and by the voltage of an output circuit of an auxiliary gas discharge tube, said tube being triggered on reception of the first dialling pulse, the arrangement being such that the circuit elements transmit a busy tone only if the auxiliary tube is conductive and no numerical gas discharge system has become conductive under the action of the metering circuit.

The conductive condition of the auxiliary tube gives the indication that a choice has been made.

In order that the invention may be clearly understood, it will now be described with reference to the accompanying drawing in which one embodiment is given by way of example.

The circuit shows in a diagrammatic and simplified form part of an electronic automatic telephone exchange in which connections between the subscriber's stations, such for example as AA and AB, can be completed by means of gas tubes, such for example as BA and BB, which act as electronic switching contacts, control being effected entirely by electronic means. The subscriber's station AA is connected via a line loop $S_1$ and $S_2$ to ends of two identical windings of a transformer TA associated with the subscriber's line LCA of subscriber AA. The other ends of the said windings are interconnected by a capacitor $C_{1a}$ and are connected by the intermediary of a resistor $R_{1a}$ to several terminals of battery BT. One end of a third winding of the transformer is connected to earth via a resistor $R_{2a}$ shunted by a capacitor $C_{2a}$, whereas the other end of said winding is connected to the cathode $k$ of gas tube BA. The anode $a$ of tube BA is connected via the loop line S of the connecting circuit VC to a multiple-wired point $P_1$ which, via an inductance L and the parallel combination of a resistor $R_1$ and a capacitor $C_1$, is connected to a supply source $V_1$ the voltage of which is equal for example to 160 v. relative to earth. A first trigger electrode $f_1$ of gas tube BA is connected to a tapping point of a potentiometer $R_{3a}$, $R_{4a}$ included between earth and the connecting point $P_2$ of inductance L and resistor $R_1$. A second trigger electrode $f_2$ is coupled by means of a time-delay network, which is constituted by resistors $R_{5a}$, $R_{6a}$ and capacitors $C_{3a}$ and $C_{4a}$, to an outlet $M_2$ of an electronic metering circuit TS which is associated with the connecting circuit VC and acts as a marking circuit. The multiple-wired point $Q_a$ is coupled similarly, by means of gas tubes not shown, to further connecting circuits. The other subscriber's lines such for example as the line LCB of subscriber AB are arranged in a similar manner to the line LCA.

The connecting circuit VC includes a vacuum tube $B_0$ and several gas tubes from $B_1$ to $B_5$ and the marking circuit TS is equipped with ten further gas tubes among which only the tubes $B_6$, $B_7$ and $B_8$ are shown in the figure. Potential variations of the multiple-wire point $P_1$ are amplified by tube $B_0$ and supplied in a reversed manner to the point U and thence passed on via capacitors $C_{10}$, $C_{40}$ and $C_{50}$ to gas tubes $B_1$, $B_4$ and $B_5$. The gas tubes $B_1$ to $B_8$ comprise each a cathode $k$, an anode $a$ and a trigger electrode $f$, as shown at tube $B_1$. The anodes of the tubes are supplied from supply source $V_1$. The voltage of this source is lower than the break-down voltage between anode and cathode of the tubes, said break-down voltage exceeding 180 volts, but is higher than the operating voltage between cathode and anode, which is 60 volts. The resistor $R_{11}$ in the anode circuit of tube $B_1$ is shunted by capacitor $C_{11}$ with the result that this tube after being struck is extinguished automatically. For the same purpose the resistors $R_{41}$ and $R_{51}$ in the cathode circuits of the tubes $B_4$ and $B_5$ are shunted by capacitors $C_{41}$ and $C_{51}$. In the normal condition of the circuit all the gas tubes are extinguished.

Tube $B_4$ serves to supply dialling pulses to the marking circuit TS, said pulses having the effect of starting up in succession one of the gas tube $B_6$, $B_7$, $B_8$ etc. When a following tube of the marking circuit strikes the preceding tube is extinguished. Tube $B_5$ has the function of restoring the marking circuit to the normal condition by extinguishing the tubes thereof. At the end of the call the entire circuit including the tubes BA and BB can be restored to the normal condition under the control of the tubes $B_1$ and $B_2$. The function of the tube $B_3$ will become apparent hereinafter.

The circuit operates as follows. Assuming that the numerals 2 and 3 are associated with the subscriber's stations AA and AB, respectively, and that subscriber AA wishes to make a call to subscriber AB. When the subscriber AA calls the line loop $S_1$ and $S_2$ of the subscriber's station is closed so that a negative-going voltage pulse is transmitted by transformer TA to the multiple-wired point $Q_a$. The trigger electrodes $f_1$ of the gas tubes, the cathodes $k$ of which are connected to the point $Q_a$ and the anodes $a$ of which are connected to free connecting circuits, have a potential which is slightly lower than the starting voltage between trigger electrode $f_1$ and the cathode $k$ so that owing to the pulses being set up across the cathodes all these tubes will be in a condition in which they are liable to break down. As soon as one of these tubes, for example BA, starts up, the main discharge path between cathode $k$ and anode $a$ of the tube also breaks down so that a current will flow from the supply point $V_1$ via resistor $R_1$, inductance L, multiple-wired point $P_1$, loop line S, discharge path between anode $a$ and the cathode $k$ of the gas tube concerned BA, multiple-wired point $Q_a$, winding of transformer TA and resistor $R_{2a}$ to earth. This gives rise to a voltage drop across the resistors $R_{2a}$ and $R_1$, with the result that the potential of the multiple-wired point $Q_a$ is increased to 50 volts and the potential of the multiple-wire point $P_2$ is decreased from 160 volts to 110 volts. The potential increase of the point $Q_a$ results in that the potential difference between the cathode $k$ and the primer electrode $f_1$ of the other gas tubes connected to the point $Q_a$ becomes less than the starting-up voltage so that these tubes cannot strike and finally only tube BA has broken down. Gas tubes which couple the line LCA to engaged connecting circuits cannot strike due to the fact that for the above-mentioned reason the multiple-wired points $P_2$ in these connecting circuits have a voltage which is lower than 160 volts so that the potential of the primer electrode $f_1$ of the gas tubes concerned is considerably lower than the starting-up voltage. The striking of gas tube BA has the effect of completing a connection between the line LCA and the connecting circuit VC, said connection enabling transmission in two directions of dialling signals and the like and intelligence currents.

Subscriber AA then dials the desired number, in the present case the digit 3. The subscriber's dial is shunted by an impedance (not shown) so that at each dialling pulse the line loop is not completely broken and the pulses which during dialling are set up across the windings of transformer TA are smaller than the pulses which are set up by the complete making or breaking of the line loop when the call is being made or when the receiver is being replaced. The differentiating effect of transformer TA results in the setting up at the beginning of each dialling pulse of a positive-going pulse and at the end of each dialling pulse of a negative-going pulse at the multiple-wire point $Q_a$. The amplitude of these pulses is comparatively low and is about 5 volts. These pulses are transmitted by the gas tube BA to the point $P_1$ and then amplified by tube $B_0$ and supplied in a reverse manner to the point U. The primer electrode of tube $B_4$ is connected via resistor $R_{40}$ to the supply point $V_2$, the voltage of which is slightly lower than the starting-up voltage of the gas tubes so that tube $B_4$ can be struck by the comparatively small positive-going pulses at the point U. Via resistors $R_{10}$ and $R_{50}$ the primer electrodes of tubes $B_1$ and $B_5$ are adjusted to a normal value $V_3$ so as to be enabled to be struck by comparatively powerful pulses only. Hence these tubes do not strike on reception of dialling pulses. At any dialling pulse tube $B_4$ strikes and immediately thereafter is extinguished owing to the presence of capacitor $C_{41}$ in the cathode circuit. The cathode of tube $B_4$ is thus subjected at each dialling pulse to an instantaneous potential increase and this positive-going pulse is transmitted via capacitors $C_{60}$, $C_{70}$, $C_{80}$ etc. to the primer electrode of the gas tubes $B_6$, $B_7$, $B_8$ etc. of the metering circuit TS. The metering circuit is of a type known per se.

The anodes of the gas tubes $B_6$, $B_7$, $B_8$, etc. are connected to the supply source $V_1$ and the cathodes are connected via resistors $R_{60}$, $R_{70}$, $R_{80}$ etc. to a common point W which is connected to earth via resistor $R_2$. The primer electrode of the first gas tube $B_6$ of the marking circuit TS is connected to a tapping point A of potentiometer $R_{33}$, $R_{34}$ which is included between the anode of tube $B_3$ and earth. So long as the gas tube $B_3$ is extinguished the point A has a potential which is slightly lower than the starting-up voltage of tube $B_6$. The cathodes $k$ of the successive tubes $B_6$, $B_7$, $B_8$ etc. of the marking circuit TS are intercoupled by capacitors $C_{71}$, $C_{81}$ etc. In addition, the primer electrodes of the tubes $B_7$, $B_8$ etc. are connected via resistors $R_{71}$, $R_{81}$ etc. to the cathode of the preceding tube. In the normal condition the gas tubes are non-conductive and the primer electrode of tube $B_6$ has a higher potential than the primer electrode of the other tubes, the potential of the last-mentioned electrodes and also that of the cathodes of the tubes of the marking circuit being equal to earth potential. At the first dialling pulse gas tube $B_6$ strikes. The voltage of the primer electrodes of the other tubes remains below the starting-up voltage. A current will then pass from the voltage source $V_1$ via the discharge path between anode $a$ and cathode $k$ of tube $B_6$ and the resistors $R_{60}$ and $R_2$ to earth with the result that the potential of the point W is increased and the potential difference between the primer electrode and the cathode of tube $B_6$ is reduced. The potential of primer electrode of tube $B_7$ increases to a greater extent than the potential of the cathode by reason of the voltage drop across resistor $R_{60}$. After the first dialling pulse only gas tube $B_6$ of the metering circuit has consequently struck and tube $B_7$ occupies a favourable position to be able to strike subsequently. Tube $B_7$ does not strike at the first dialling pulse since during the increase of the potential of the cathode of tube $B_6$ a positive-going voltage pulse is transmitted both to the cathode of tube $B_7$ via capacitor $C_{71}$ and to the primer electrode of tube $B_7$ via resistor $R_{71}$, said pulses being subtractive in effect.

Owing to the potential increase at the cathode of tube $B_6$ the voltage of the primer electrode of tube $B_3$, which electrode is connected via resistor $R_{30}$ to the cathode of tube $B_6$, increases beyond the starting-up voltage so that tube $B_3$ strikes. Tube $B_3$ remains conductive until at the end of the call. The voltage of the anode of tube $B_3$ decreases with the result that the voltage of the point A which is connected to the primer electrode of tube $B_6$ is reduced to a comparatively low value. Owing to the presence of capacitor $C_{30}$ tube $B_3$ strikes with some time lag after tube $B_6$ so that the voltage of the primer electrode of $B_6$ does not decrease until after tube $B_6$ has struck. The primer electrode of tube $B_6$ has thus assumed such a low potential value as to prevent tube $B_6$ from restriking during the break-down of tube $B_4$ even if the voltage of the cathode of tube $B_6$ were equal to earth potential. The cathode of tube $B_6$ is connected in addition via conductor $M_1$ and a time-delay network (not shown), which is similar to the networks $R_{6a}$ and $R_{5a}$, $C_{4a}$, $C_{3a}$ of line LCA and $R_{6b}$, $R_{5b}$, $C_{4b}$ and $C_{3b}$ of line LCB respectively, to the primer electrode $f_2$ of a gas tube in the subscriber's line with which the digit 1 is associated. Although the voltage of the cathode of tube $B_6$ increases beyond the starting-up voltage of the tube in the last-mentioned line this tube cannot strike since by reason of the time-delaying effect of the time-delay circuit concerned the voltage of the primer electrode of this tube increases only slowly and cannot reach the starting-up value because at the next following dialling pulse tube $B_6$ is re-extinguished and the voltage of the cathode of this tube is reduced below the starting-up voltage.

At the second dialling pulse gas tube $B_4$ strikes a second time and supplies a second positive-going pulse via capacitors $C_{60}$, $C_{70}$, $C_{80}$ etc. to the primer electrode $f$ of all the gas tubes of the metering circuit TS. As the primer electrode of tube $B_7$ has by now the highest potential of the primer electrodes of the metering tubes gas tube $B_7$ strikes at the second dialling pulse with the result that the potential of the cathode of this tube is increased and a positive-going voltage pulse is transmitted via capacitor $C_{71}$ to the cathode of tube $B_6$ with the result that this tube extinguishes. After the second dialling pulse the primer electrode of tube $B_8$ has the highest potential of the primer electrodes of the metering circuit since this electrode is coupled via resistor $R_{81}$ to the cathode of tube $B_7$ so that by now tube $B_8$ is in a preferential position as far as break-down is concerned. Similarly tube $B_8$ strikes and tube $B_7$ extinguishes at the third dialling pulse. The cathode of tube $B_8$ is coupled via conductor $M_3$ and the time-delay network $R_{6b}$, $R_{5b}$, $C_{4b}$ and $C_{3b}$ to the primer electrode $f_2$ of gas tube BB of the desired subscriber's line AB which corresponds to digit 3. Since no further dialling pulses follow after the third dialling pulse, the voltage of the said primer electrode of tube BB is enabled to increase to the starting-up value so that tube BB strikes if the subscriber AB is not engaged. However, it must be assumed first of all that subscriber AB is engaged. In this case one of the gas tubes (not shown) the cathode of which is connected to the point $Q_b$ is in a conductive condition and the voltage of the point $Q_b$ is equal to 50 volts or 33 volts respectively in accordance with the subscriber AB making a call or being engaged. In this case, when the voltage of the primer electrode of tube BB has increased to the voltage of the cathode of tube $B_8$, there is only a voltage between the said primer electrode $f_2$ and the cathode $k$ of tube BB which is lower than the starting-up voltage so that tube BB is prevented from striking.

In this case subscriber AA should receive busy tone which is supplied to him by means of the next following circuit. The busy tone generator BG is connected via capacitor $C_2$ to a tapping point B of the potentiometer $R_3$, $R_4$, said tapping point being connected on the one hand via rectifier $G_3$ to the multiple-wired point $P_1$ of the connecting circuit VC and on the other via rectifier $G_4$ to the anode of tube $B_3$. In the normal condition of the circuit the tubes having their anodes connected to the point $P_1$ are not conductive and neither is tube $B_3$. In this case the multiple-wired point $P_1$ and the anode of tube $B_3$ have a voltage of 160 volts. After subscriber AA when making a call has completed a connection via gas tube BA to the connecting circuit VC, the potential of the multiple-wired point $P_1$ is reduced to 110 volts, whereas the anode of tube $B_3$ retains a voltage of 160 volts so that rectifier $G_4$ is conductive and rectifier $G_3$ is cut off. Busy tone generator BG is thus prevented from supplying busy tone via capacitor $C_2$ and rectifier $G_3$ to the loop line S. After tube $B_3$ has struck at the first dialling pulse the voltage of the anode of this tube is reduced to 60 volts so that rectifier $G_4$ is cut off. The point B of potentiometer $R_3$, $R_4$ is such that if rectifiers $G_3$ and $G_4$ are both cut off the point B has a voltage of 105 volts. Thus, on rectifier $G_4$ being cut off rectifier $G_3$ becomes conductive because the point $P_1$ has a voltage of 110 volts. The busy tone generator BG is thus enabled to supply busy tone via capacitor $C_2$, rectifier $G_3$, loop line S, gas tube BA and transformer TA to the subscriber's station AA. However, it is not possible for subscriber AA to hear this busy tone in his telephone receiver since the latter is short-circuited during dialling. After the dial has re-assumed its normal position the said short-circuit is removed and the subscriber receives busy tone, at least on the assumption that subscriber AB is engaged so that gas tube BB cannot strike after the third dialling pulse.

If the receiver at subscriber's station AA is replaced after its call has not been answered, the release of the line loop has the effect of setting up a powerful positive-going pulse in the windings of transformer TA with the result that the potential of the point $Q_a$ is increased. Generally, this closing pulse is sufficiently powerful to extinguish the gas tube BA so that a powerful positive-going pulse is set up at the point $P_1$. If owing to high line-resistance the pulse at the point $Q_a$ were not sufficiently powerful to extinguish tube BA at once, the tube transmits the pulse to the point $P_1$ so that even in this case a powerful positive pulse is set up at the point $P_1$. The closing pulse is transmitted by tube $B_0$, after reversal, to the point U and thence transmitted via capacitor $C_{10}$ and rectifier $G_1$ to the cathode of gas tube $B_1$. The primer electrode $f$ of tube $B_1$ is connected to a source $V_3$ of such voltage that tube $B_1$ strikes if a powerful negative-going pulse, such for example as is set up when the subscriber replaces the receiver, is supplied to the cathode but cannot strike at a comparatively feeble pulse, such as is set up for example at a dialling pulse. Since the resistor and the cathode conductor of tube $B_1$ must have a comparatively low value in order that after striking the tube may be extinguished at once under the influence of capacitor $C_{11}$, the cathode circuit includes in series with resistor $R_{12}$ a rectifier $G_2$ which is polarised in a manner such that upon the occurrence of a negative-going pulse at the cathode of tube $B_1$ the rectifier is cut off and the pulse is not damped by the low resistance $R_{12}$. The negative-going pulse has the effect of increasing the voltage between the primer electrode $f$ and the cathode $k$ of tube $B_1$ so that the tube strikes with the result that the cathode voltage is suddenly intensely increased and capacitor $C_{20}$ transmits a positive-going pulse to the primer electrode of tube $B_2$, which thereupon strikes. Rectifier $G_2$ also becomes conductive. The voltage of the anode of tube $B_2$ is suddenly decreased from 160 volts to 60 volts and a powerful negative-going pulse is transmitted via capacitor $C_{21}$ and loop line S to the anode $a$ of tube BA with the result that tube BA extinguishes and the connection between the lines LCA and the connecting circuit VC is broken. The negative-going pulse at the loop-line S is reversed in polarisation by tube $B_0$ and supplied to the point U whilst at the same time a positive-going pulse is transmitted by rectifier $G_1$ and capacitor $C_{10}$ directly from the cathode of tube $B_1$ to the point U. Said positive-going pulses have the effect of starting-up tube $B_4$ and of causing the metering circuit TS to occupy the next following position in the manner already described. However, in this case the positive-going pulse at the point U is powerful enough for the gas tube $B_5$ to strike also. The resulting positive-going pulse at the cathode of tube $B_5$ is transmitted via capacitor $C_{52}$ and the resistors $R_{60}$, $R_{70}$, $R_{80}$ etc. to the cathodes of all the tubes of the metering circuit with the result that the started-up tube exinguishes. Tube $B_2$ exinguishes spontaneously by reason of the presence of capacitor $C_{21}$ in the anode circuit. Capacitor $C_{12}$ transmits a negative-going pulse from the anode of tube $B_1$ to the anode of tube $B_3$ so that this tube extinguishes as well. The circuit has thus re-assumed its normal condition.

As mentioned before, while a call is being made by subscriber AA the potential of the point $P_1$ is decreased as a result of the breakdown of gas tube BA. By reason thereof tube $B_0$ supplies a powerful positive-going pulse to the point U so that gas tube $B_4$ strikes and tube $B_6$ of the metering circuit also breaks down in the manner before described, similarly as on reception of the first dialling pulse. However, the positive-going pulse at the point U is thus powerful enough for the gas tube $B_5$ to strike as well, with the result that tube $B_6$ re-extinguishes at once, as described hereinbefore, before the gas tube by which the connecting circuit is coupled to the subscriber's line corresponding to the digit 1 is allowed to strike. The rectifier $G_1$ prevents the powerful positive-going pulse of the point U from being transmitted via the capacitors $C_{19}$ and $C_{20}$ to the primer electrode of tube $B_2$. Consequently, in contradistinction to dialling pulses, the pulse which is set up during a call at the point $P_1$ does not result in a permanent change of the starting-up condition of the gas tubes of the metering circuit TS.

Assuming now that the called subscriber is not engaged. In this case, the starting up of gas tube $B_8$ results in breakdown of the gas tube BB since by now the voltage of the cathode of this tube is equal to earth potential. The currents passing through the main discharge path between anode and cathode of the tubes BA and BB respectively pass jointly through resistor $R_1$ and inductance L so that the point $P_1$ assumes a potential of 93 volts and the multiple-wired points $Q_a$ and $Q_b$ in the lines LCA and LCB assume a voltage of 33 volts. The potential decrease of the point $P_1$ to 93 volts results in that rectifier $G_3$ is cut off and the point B assumes a potential of 105 volts since rectifier $G_4$ is also cut off because the anode of the tube $B_3$ has a voltage of 60 volts. A busy tone is consequently not transmitted. By reason of the potential of 33 volts at the points $Q_a$ and $Q_b$ the lines LCA and LCB are marked engaged so that, as set out hereinbefore, they no longer can be reached via a further connecting circuit. As a result of the potential decrease of the point $P_1$, tube $B_0$ transmits a positive-going pulse to the point U which pulse starts up both gas tubes $B_4$ and $B_5$ so that a following tube in the metering circuit TS strikes but immediately re-extinguishes due to the starting up of tube $B_5$. If the line LCB is consequently free the metering circuit is caused to re-assume its normal condition directly upon dialling. This is also necessary for a further reason, since if the metering circuit were not extinguished until after the end of the call, the primer electrode $f_2$ of tube BB would, after extinguishment of all the tubes of the connecting circuit and the tubes BB and BA, preserve for some time a comparatively high voltage due to the presence of the capacitors $C_{3b}$, $C_{4b}$ so that tube BB would be enabled to re-start.

If the subscriber AB lifts the receiver for answering the call, the closure of the line loop has the effect of setting up a negative-going voltage pulse at the point $Q_b$, similarly as when a call is made, said pulse being transmitted by the gas tube BB to the point $P_1$ and being passed on by the tube $B_0$ as a positive-going pulse to the point U. The tubes $B_4$ and $B_5$ thus re-ignite and re-extinguish automatically without any further result. The desired connection between the subscribers AA and AB is thus completed and intelligence currents can be transmitted in either direction between the subscriber's stations via transformer TA, the main discharge path between the cathode and anode of the tubes BA and BB and transformer TB.

If at the end of the call one of the subscribers replaces the receiver a powerful positive-going closure pulse is transmitted to the point $P_1$ with the result that in the manner hereinbefore described the gas tubes BA and BB are caused to extinguish, similarly to tube $B_3$ which remains conductive during the call.

The entire circuit has thus re-assumed its normal condition. If by now the second subscriber, say, subscriber AB, replaces the receiver, this has the effect of setting up at the point $Q_b$ a positive-going pulse the polarity of which, however, prevents tube BB from being re-ignited.

If during the call one of the subscribers would re-dial the metering circuit TS would re-record this number in the manner hereinbefore described so that an unwanted connection to a further subscriber's line would be completed. Such situation may also occur if instead of a subscriber's line a selector of a subsequent selecting stage were connected to the windings of transformer TB, the said selector being required to be adjusted by a subsequent pulse train. Even in this case the metering circuit must not respond again once the digit is selected. This is prevented by the presence of tube $B_3$. As mentioned before, tube $B_3$ strikes at the first pulse of the first pulse train and remains conductive up to the end of the call. Thus, the anode of tube $B_3$ has a potential of 60 volts so that point A has a potential which is comparatively far below the starting-up voltage of the gas tubes and gas tube $B_6$ is prevented from re-igniting during the break-down of tube $B_4$.

What is claimed is:

1. In an automatic telephone system provided with an incoming line and a plurality of outgoing lines, the combination comprising apparatus to complete an intelligence connection between said incoming line and one of said outgoing lines and including a plurality of gas discharge tubes having an anode, a cathode and an ignition electrode for providing connections between said lines, means for supplying to said incoming line a first operating potential having a first value when one of said discharge tubes is conductive and a second value greater than said first value when said discharge tube is non-conductive, an electronic marking circuit for receiving dialing pulses coupled to said incoming line, said marking circuit having a plurality of output marking points, each of said points being connected to a different one of said ignition electrodes, an auxiliary gas discharge tube having an output electrode and a trigger electrode, means for supplying to the output electrode of said auxiliary tube a second operating potential having a first value when said auxiliary tube is conductive and a second value greater than said first value when said discharge tube is non-conductive, said auxiliary tube being coupled to said marking circuit and being adapted to ignite upon the reception of the first dialing pulse in said circuit, a busy tone generator, and circuit elements for connecting said generator to the output electrode of said auxiliary tube and to said incoming line, said circuit elements being responsive to variations of the voltage of said incoming line and to the voltage of said output electrode and being thereby adapted to transmit a busy tone to said incoming line only when said first operating potential has said second given value and said second operating potential has said first value.

2. Apparatus, as set forth in claim 1, wherein said marking circuit includes a plurality of successive gas discharge systems, each discharge system comprising a gas discharge device and a cathode lead having a resistor connected to said device, and a plurality of delay networks, each of the devices of said discharge systems being triggered in succession by said dialing pulses and each of said devices being extinguished at a subsequent dialing pulse, each of said cathode leads being coupled via one of said plurality of time delay networks to one of said ignition electrodes, said trigger electrode of said auxiliary tube being coupled via another of said plurality of time delay networks to a point of the cathode lead of the first of said plurality of discharge systems.

3. Apparatus, as set forth in claim 1, wherein said circuit elements include a first rectifier, a second rectifier and a resistor, said busy tone generator being coupled to a point on said resistor, said first rectifier being connected between said point and said incoming line, said second rectifier being connected between said point and the output electrode of said auxiliary discharge tube, said point having supplied to it a voltage having a value at which said second rectifier is non-conductive when said auxiliary gas tube is conductive and said first rectifier is conductive when said second rectifier is non-conductive and when at the same time the operating potential of said incoming line is greater than the voltage at said point, and said first rectifier is non-conductive in a first condition when said second rectifier is conductive and in a second condition when said second rectifier is non-conductive and when at the same time the operating potential of said incoming line is less than the voltage at said point.

4. A busy tone circuit for an automatic telephone system in which connections of a member for numerical completion of an intelligence connection between an incoming line and one of a plurality of outgoing lines are constituted by gas discharge systems having a first electrode which is connected to the incoming line which is connected via an input resistor to a first terminal of a supply source and having a second electrode connected via an output resistor to a second terminal of said supply source and coupled to one of said outgoing lines and in which an electronic marking circuit for receiving dialing pulses is coupled to said incoming line, said incoming line having a first operating potential having a first value when one of said discharge tubes is conductive and a second value greater than said first value when said discharge tube is non-conductive, said marking circuit having a plurality of output marking points which are coupled to a trigger electrode of the numerically corresponding gas discharge systems for triggering a gas discharge system which numerically corresponds to the dialed number, the potential drop across the associated output resistor being effective at at least one electrode of the gas discharge system concerned in a manner such that this system is prevented from being triggered when the line is engaged, comprising an auxiliary gas discharge tube having an output electrode, means for supplying to the output electrode of said auxiliary tube a second operating potential having a first value when said auxiliary tube is conductive and a second value greater than said first value when said discharge tube is non-conductive, a busy tone generator, and circuit elements connecting said generator to said incoming line and to said auxiliary tube output electrode, said auxiliary tube being coupled to said marking circuit and being triggered on reception of the first dialing pulse in said marking circuit, said circuit elements being responsive to variations of the voltage of said incoming line and to the voltage of said output electrode and being thereby adapted to transmit a busy tone to said incoming line only when said first operating potential has said second given value and said second operating potential has said first value.

No references cited.